United States Patent Office 3,207,632
Patented Sept. 21, 1965

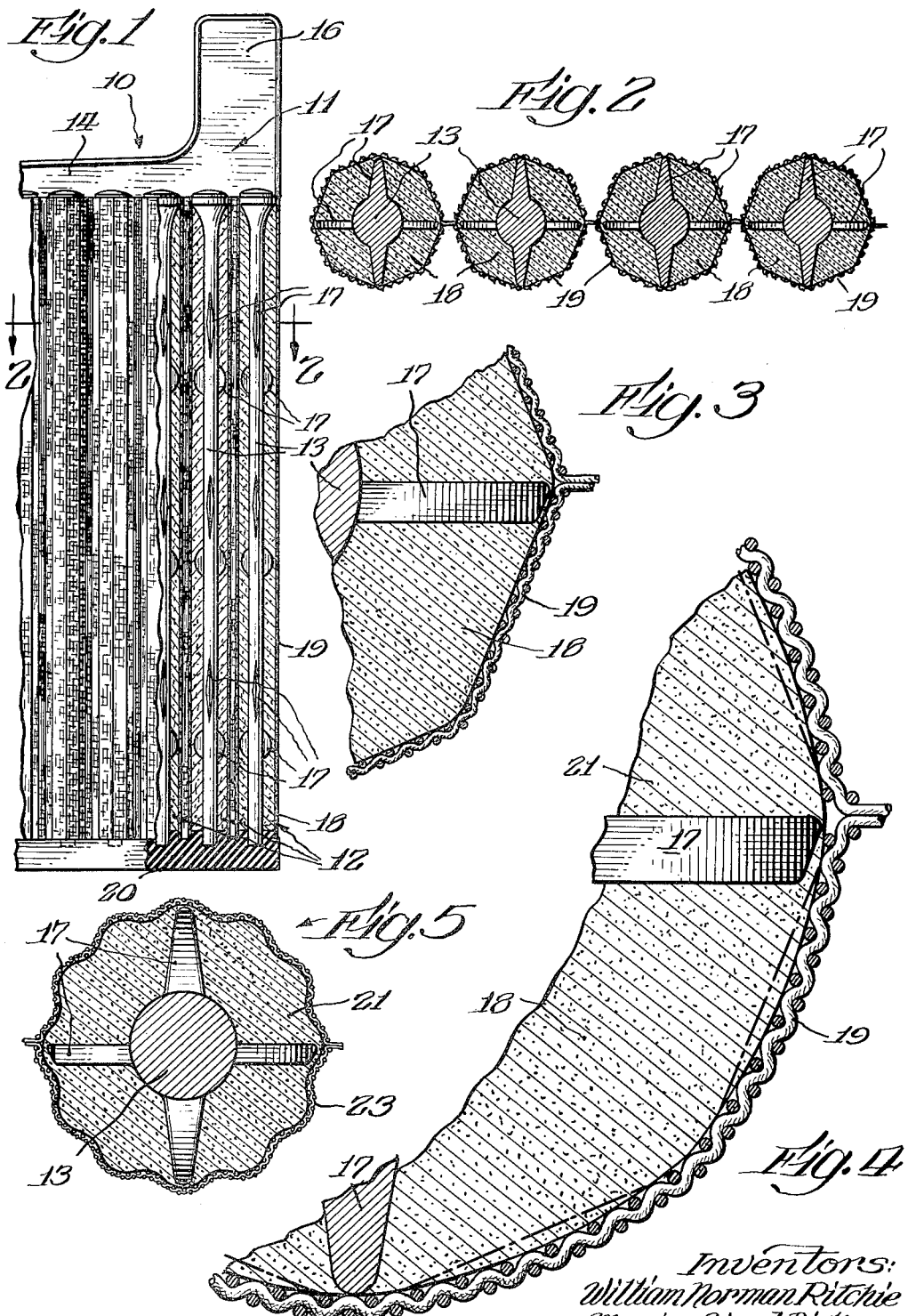

3,207,632
EXPANDABLE STORAGE BATTERY PLATES
Marion Ward Dickover, Glenview, and William Norman Ritchie, Prospect Heights, Ill., assignors to KW Battery Company, Skokie, Ill., a corporation of Illinois
Filed Mar. 5, 1962, Ser. No. 177,301
2 Claims. (Cl. 136—16)

This invention relates to battery plates and more particularly to an improved pencil type electrode structure for lead-acid storage battery plates.

Lead-acid storage battery plates of the pencil type generally include a plurality of electrodes that are arranged in uniform spaced parallel relation and electrically connected to a suitable conductor. Each of the electrodes contains a pencil of active material supported on a central spine formed of a conductive alloy. The active material pencils, which undergo the electrochemical reaction to produce battery potential, are enclosed within porous supporting sleeves or sheath.

As is well known, separate reactions take place at the positive and negative plates of a lead-acid storage battery. For example, pasted negative plates incorporating a spongy lead (Pb) active material and positive plates which include pencils of an active material such as lead peroxide ($PbO_2$) react with the electrolyte ($H_2SO_4$) so that insoluble lead sulphate is formed in the pencils. In addition to the buildup of insoluble lead sulphate and the inherent expansion of the active material, other factors (depending upon the nature and proportions of the materials involved) cause the active material pencils to grow and expand in a radial direction. The expansion of the pencils proceeds primarily in a radial direction inasmuch as longitudinal expansion thereof is precluded by the confining nature of the supporting structure.

Heretofore, electrode structures of the pencil type have inherently had difficulty in effectively accommodating this expansion. Because of the snug fit necessary between the sleeves and the pencil, any expansion which occurs in the pencil produces transverse stress in the encompassing sleeve. This transverse stress, termed "hoop stress" for the purpose of this description can cause rupturing of the pencil supporting sleeve with consequent impairment of battery efficiency.

It is the principal object of the invention to provide an improved electrode structure of the pencil type for use in storage battery plates.

Another object of the invention is to provide an improved electrode structure which will readily accommodate the expansion of the active material incorporated therein without imparting undue stress to the sheathing that encloses the active material.

A more specific object is to provide a manner for enclosing an active material pencil within a sleeve of a similar cross section so that support is provided for the pencil and expansion of the cross sectional area is accommodated without substantial change in the perimeter of the sheath.

Other objects and advantages of the invention will be apparent from the following description when considered in conjunction with the accompanying drawings wherein:

FIGURE 1 is a fragmentary elevational view partly broken away of a storage battery plate incorporating an electrode structure embodying various of the features of the invention;

FIGURE 2 is an enlarged sectional view taken along line 2—2 of FIGURE 1;

FIGURE 3 is an enlarged fragmentary view illustrating a portion of the structure shown in FIGURE 2 when in an initially unexpanded state;

FIGURE 4 is an enlarged view of the structure depicted in FIGURE 3 when in an expanded state and FIGURE 5 is an enlarged view similar to FIGURE 2 illustrating another embodiment of an electrode which includes various of the features of the invention.

Shown in the drawings are pencil-type electrode structures embodying various features of the invention. Each of the structures includes a pencil of active material formed with a generally regular, but non-circular, cross section. As used in the following description, the term "generally regular" is used to define a cross sectional configuration having a perimeter that follows a generally uniform but non-circular pattern. Encompassing each pencil is a porous fabric sleeve of a correspondingly similar shape which is proportioned to tightly grip the pencil. As the pencil expands within this containing sleeve, the pencil will approach a cylindrical cross section, and the sleeve will be deformed to correspond thereto. The deformation of the sleeve is such that the resulting generally circular-shaped cross section of the expanded sleeve has a circumference substantially equal to the perimeter of the sleeve in an unexpanded state, although the area defined thereby is substantially greater. At the same time, supporting engagement is maintained between the sleeve and pencil.

Referring in particular to FIGURE 1, a portion of a storage battery plate 10 is shown which includes the electrode structure contemplated by the present invention. More particularly, the plate 10 includes a grid structure 11 which supports a plurality of electrodes 12. The grid structure comprises a series of rods or spines 13 that are cast integral with a conductive bar or bus 14 from which a terminal 16 also extends. The upper end portion of each of the spines 13 is gradually enlarged or tapered so as to terminate in a circular form at the junction of the spine with the bar 14. A series of staggered fins 17 project radially from each of the spines 13 and serve as centering elements for the electrodes 12 and, more particularly, for porous confining sleeves which form an integral part thereof.

Preferably each of the electrodes 12 includes a pencil 18 of an active material, such as lead oxide that is formed about the conductive spine 13. Each pencil 18 is formed with a regular but non-circular configuration and is surrounded and gripped by a similarly proportioned protective sleeve 19. The upper extremity of each sleeve 19 is fitted over and secured in sealing relation to the enlarged and tapered upper portion of each of the spines 13.

The storage battery plate structure 10 incorporating the aforedescribed elements can be readily fabricated so that each individual electrode has the desired regular, but non-circular configuration. Initially, each of the sleeves 19 is formed with a multi-sided cross-sectional configuration corresponding to that desired for the active material pencils (i.e., hexagonal, octagonal, etc.). Thereafter, the grid structure is mounted in an inverted position and the suitably proportioned protective sleeves 19 are situated over and centered about the spines 13 so that the region defined about each spine by the inner surface of the sleeve serves as the mold for the active material pencils. The mold-defining sleeves are then filled with lead oxide or other suitable active material and compacted about the central spines by the well-known vibration method. In this connection, each of the sleeves is filled to a level just below the exposed ends of the confining sleeves beyond which the free ends of the central supporting spines 13 project slightly. The open ends of the sleeves are thereafter closed by the positioning of a suitably shaped elongated capping element 20 over the end thereof. Preferably, the capping element is provided with a series of circular grooves that are proportioned to receive the ends of the tubes, along with a number suitably dimensioned cylindrical recesses to accommodate the projecting ends of the spines 13. The capping element 20 which can be made from a suitable hard plastic material will be secured to the free ends of the sleeves and spines so that the active material forming the pencils will be tightly confined within the region defined by the sleeves. This joining will be such that during subsequent battery operation, the expansion of the active material pencils will not adversely affect the sealing relationship of the capping element over the ends of the sleeves.

Preferably the confining sleeves 19 are made from a fabric material that is electrically insulating and porous to the battery electrolyte. Examples of materials suitable for the fabrication of sleeves include fabrics made from "Dacron" (polyester of dimethyl terephthalate and ethylene glycol), polyvinyl chloride, polystyrene, polyethylene, members of the acrylic resin groups, copolymers of the above, or glass fibers. If a thermoplastic fabric is chosen, the sleeve 19 can be easily shaped with the desired generally regular but non-circular configuration by heat forming. If a non-thermoplastic material is chosen, the fabric can be treated with a suitable stiffening agent so that it can be given the desired shape prior to the molding or forming of the active material pencils herein.

The construction of a pencil and a tubular sleeve 19 having generally regular polygonal transverse cross sections provides a structure which can undergo a substantial increase in volume without substantial stretching of the fabric sleeve. As illustrated in FIGURES 3 and 4, the expansion of the pencil proceeds uniformly about its perimeter in a radial direction, and the cross sections of the pencil and sleeve 19 approach circular configurations. Because a circle encloses a greater area than a polygon of the same perimeter, the deformation of the sleeve 19 to a cylindrical shape, accommodates substantial growth in the volume of the pencil without substantial stretching of the sleeve 19. Once the pencil 18 has reached a cylindrical configuration, any further expansion of the pencil 18 is compensated for by the resiliency of the fibers used in the sleeve fabric.

As illustrated in FIGURE 2, the sleeve 19 and pencil 18 are preferably formed having transverse cross sections in the shape of a regular octagon. Inasmuch as a circle with the same perimeter as a regular octagon encompasses an area approximately 5½% greater than the area of the octagon, the pencil 18 can expand an amount equal to 5½% of its initial volume as the sleeve 19 is forced to a cylindrical shape. Pencils and sleeves shaped with a cross section of either a regular hexagon or a regular decagon have also proved very satisfactory. These constructions allow increases in volume of approximately 10% and 3½% respectively before stretching of the sleeve occurs.

Although polygon shaped pencils and sleeves yield highly satisfactory results, other regular but non-circular shapes can be utilized to the same advantage. For example, as shown in FIGURE 5, a pencil 21 having a generally regular non-polygonal cross section, when disposed in a sleeve 23 of a similar shape, likewise allows the pencil 21 to substantially expand without substantially stretching the sleeve 23.

It has been previously stated that sleeves which will meet the purposes of the present invention are made from fabrics of electrical insulating materials. It is likewise obvious that the sleeves must be freely permeable to the battery electroylte. Although the porosity of the material must be high, it is necessary to insure that the individual voids formed in the fabric are small enough to preclude particles of active material from breaking up and migrating therethrough, both before or after substantial expansion of the active material has taken place. Likewise, it should be clear that the present invention contemplates the use of a sleeve which is shape-retaining but not rigid. These characteristics allow a pencil of a specific shape to be compacted therein and permit subsequent deformation of the sleeve without the possibility of break-up and loss of the active material.

Furthermore, the invention improves storage battery electrical operation by providing an electrode structure which permits expansion of the active material pencils before any appreciable stress results in the fabric retaining sleeves. Accordingly, a greater amount of resiliency will remain in these sleeves than in sleeves of a like material in the usual storage battery arrangement having cylindrical pencils in cylindrical retaining sleeves. An additional advantage yielded by this last feature of the invention resides in the fact that certain less resilient fabrics can be utilized in the electrode structure contemplated by the invention which cannot be utilized in the conventional circular electrode structures.

Various features of the invention are set forth in the following claims.

What is claimed is:

1. An electrode structure for use in storage battery plates which comprises a pencil of active material and a deformable tubular sleeve of resilient electrical insulating fabric surrounding said pencil and proportioned so as to firmly grip the outer surface thereof, said pencil and said sleeve each being formed with similarly shaped generally regular non-circular cross sectional configurations such that deformation of said fabric sleeve to a substantially circular cross-sectional configuration effects an increase in the volumetric capacity thereof from approximately 3½–10 percent of the initial volume without a corresponding increase in the perimeter of said sleeve.

2. An electrode structure for use in storage battery plates utilizing pencils of active material disposed within fabric retaining sleeves wherein expansion of the pencils is accommodated without substantial stretching of the sleeves, which structure comprises a pencil having an octagonal cross section and a similarly shaped deformable tubular sleeve of resilient electrical insulating fabric surrounding the pencil and proportioned so as to firmly grip the outer surfaces of the pencil.

References Cited by the Examiner

UNITED STATES PATENTS 1,510,617  10/24  Vare.

FOREIGN PATENTS 11,454   9/85   Great Britain.
446,751  2/48   Canada.
229,327  11/58  Australia.

JOHN H. MACK, *Primary Examiner.*